(No Model.)

12 Sheets—Sheet 2.

A. BALL.
MACHINE FOR BUNDLING WOOD.

No. 586,944.

Patented July 20, 1897.

WITNESSES:

INVENTOR
Albert Ball
BY Bresen & Knauth
Attorneys.

(No Model.) 12 Sheets—Sheet 3.
A. BALL.
MACHINE FOR BUNDLING WOOD.
No. 586,944. Patented July 20, 1897.
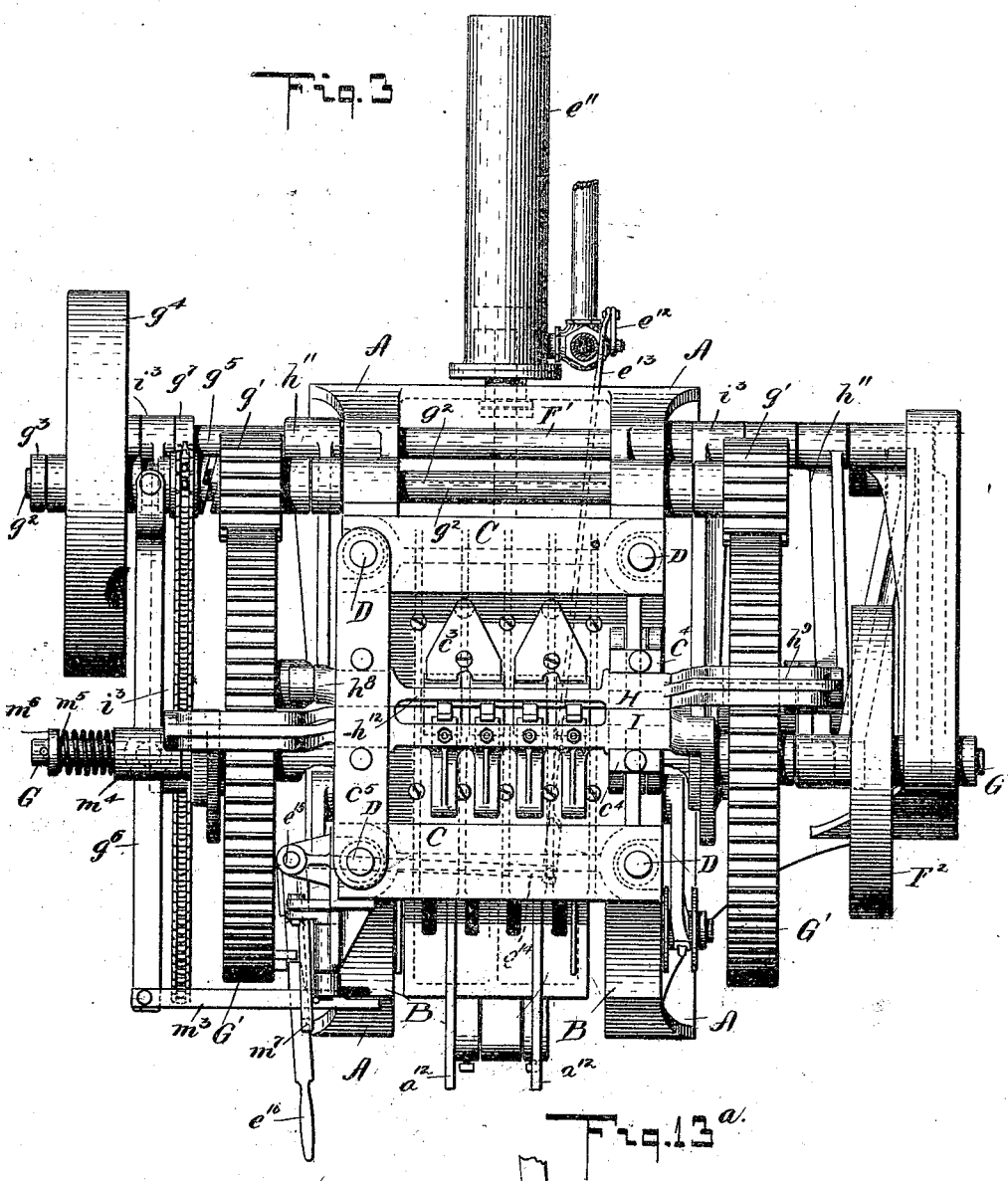
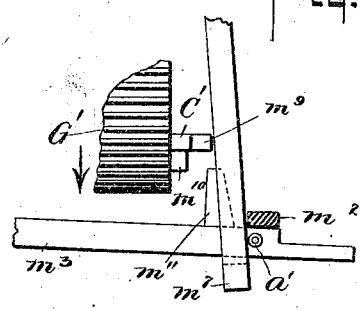
WITNESSES:
INVENTOR
Albert Ball
BY Briesen & Knauth
ATTORNEYS.

(No Model.) 12 Sheets—Sheet 4.
A. BALL.
MACHINE FOR BUNDLING WOOD.
No. 586,944. Patented July 20, 1897.
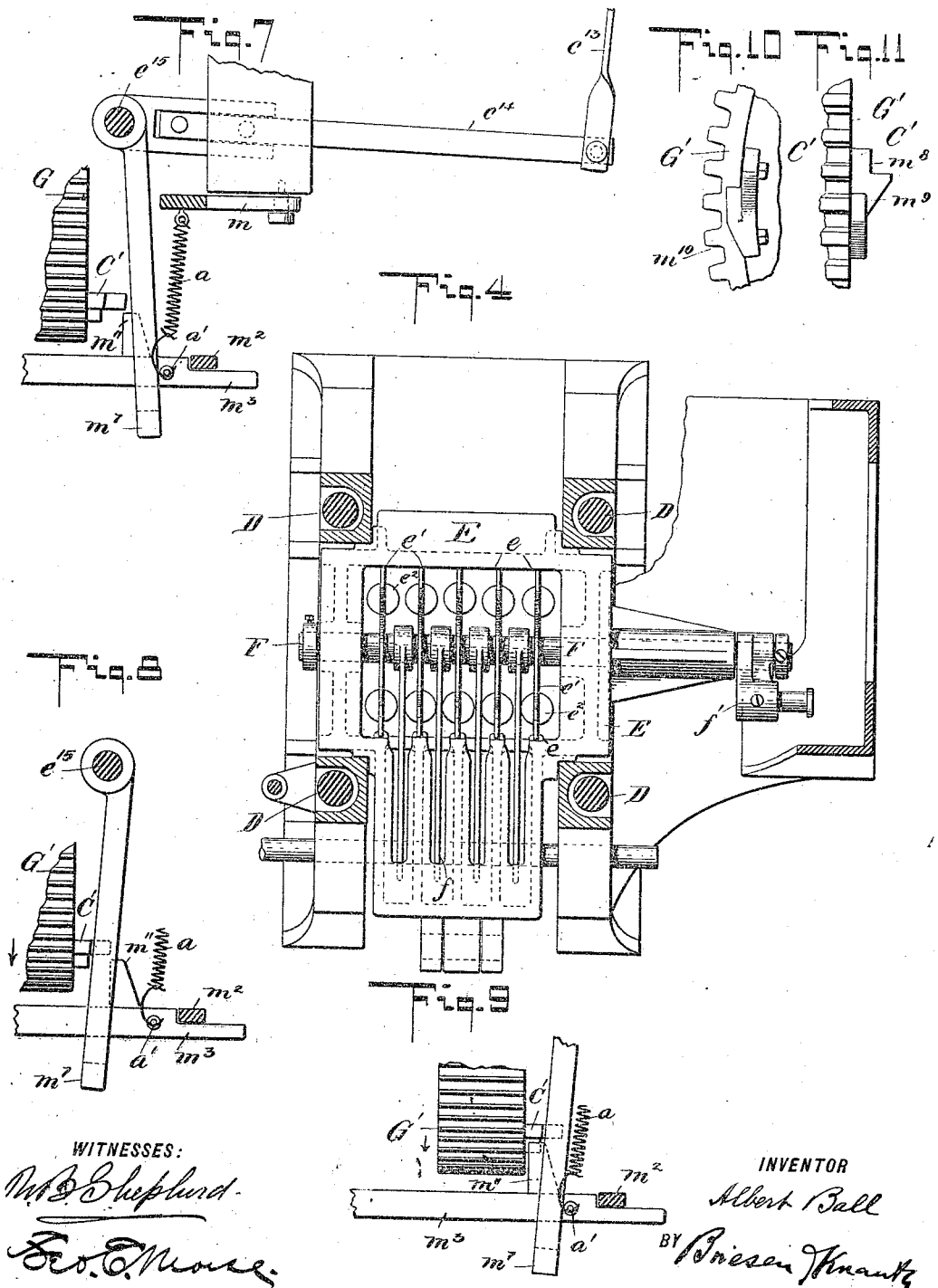
WITNESSES:
INVENTOR
Albert Ball
BY
ATTORNEYS.

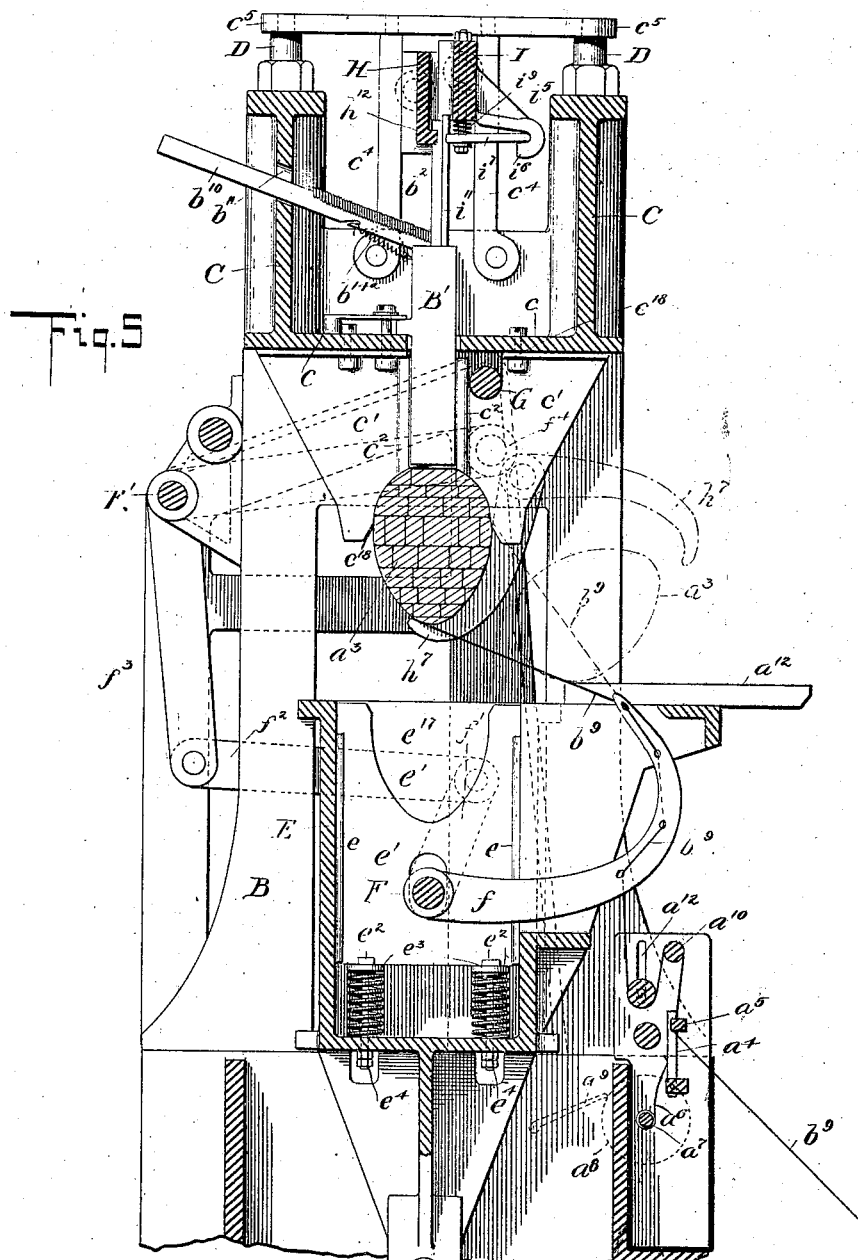

(No Model.)
A. BALL.
MACHINE FOR BUNDLING WOOD.
No. 586,944.
Patented July 20, 1897.
12 Sheets—Sheet 6.
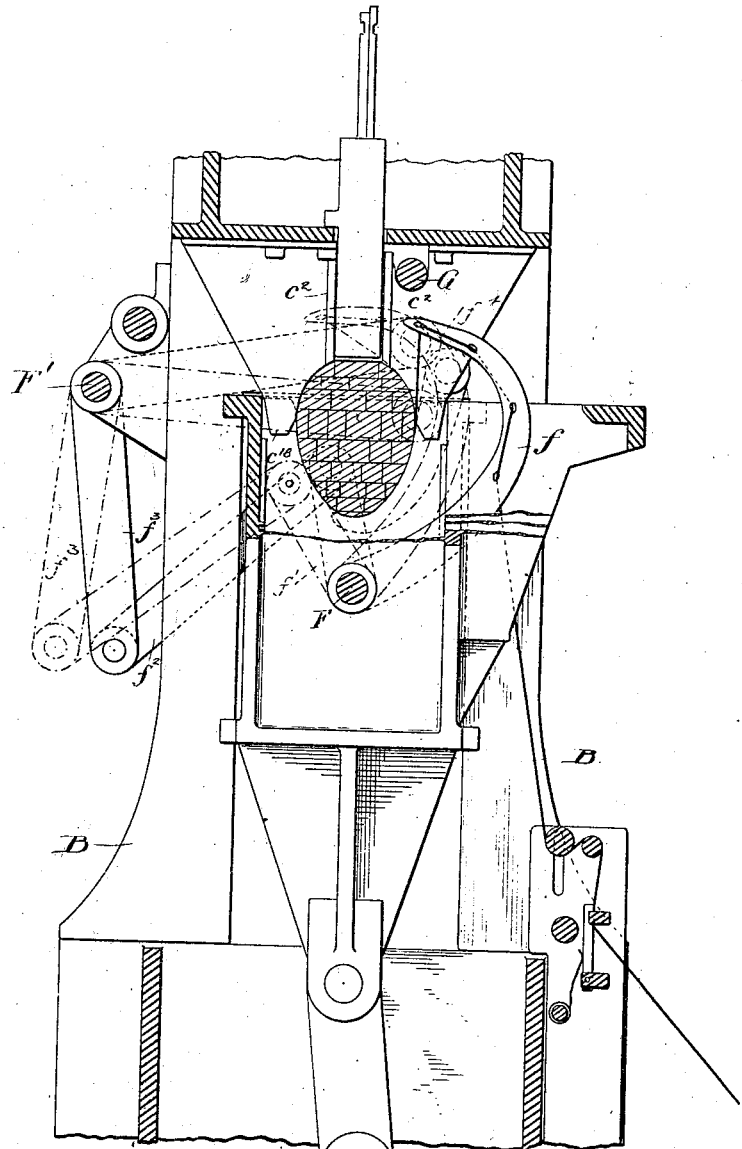
WITNESSES:
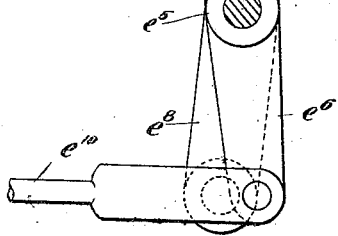
INVENTOR
Albert Ball
BY Briesen & Knauth
ATTORNEYS

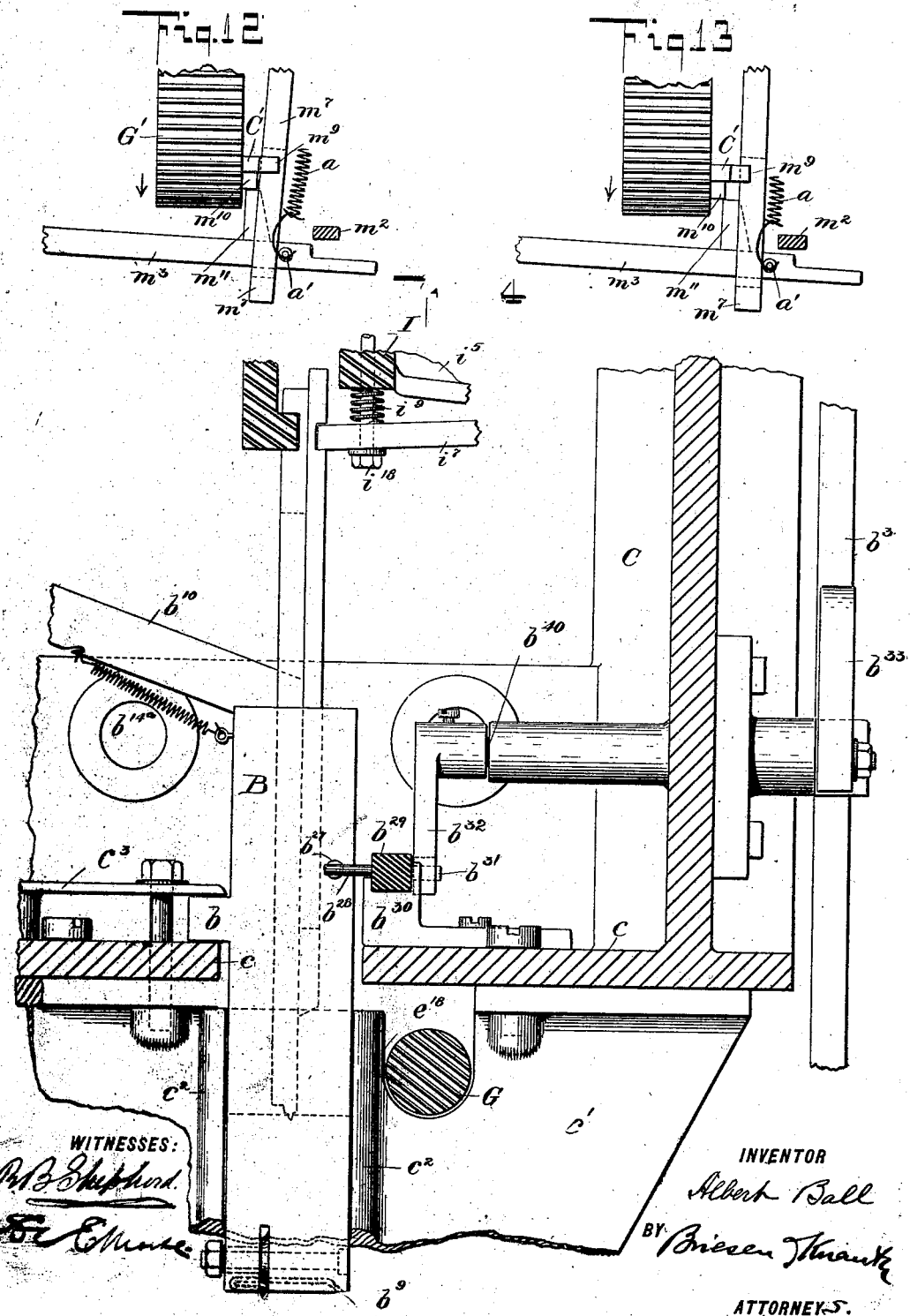

(No Model.)

A. BALL.
MACHINE FOR BUNDLING WOOD.

No. 586,944. Patented July 20, 1897.

12 Sheets—Sheet 8.

WITNESSES:
W. B. Shepherd.
Geo. E. Moore.

INVENTOR
Albert Ball
BY Briesen & Knauth
ATTORNEYS

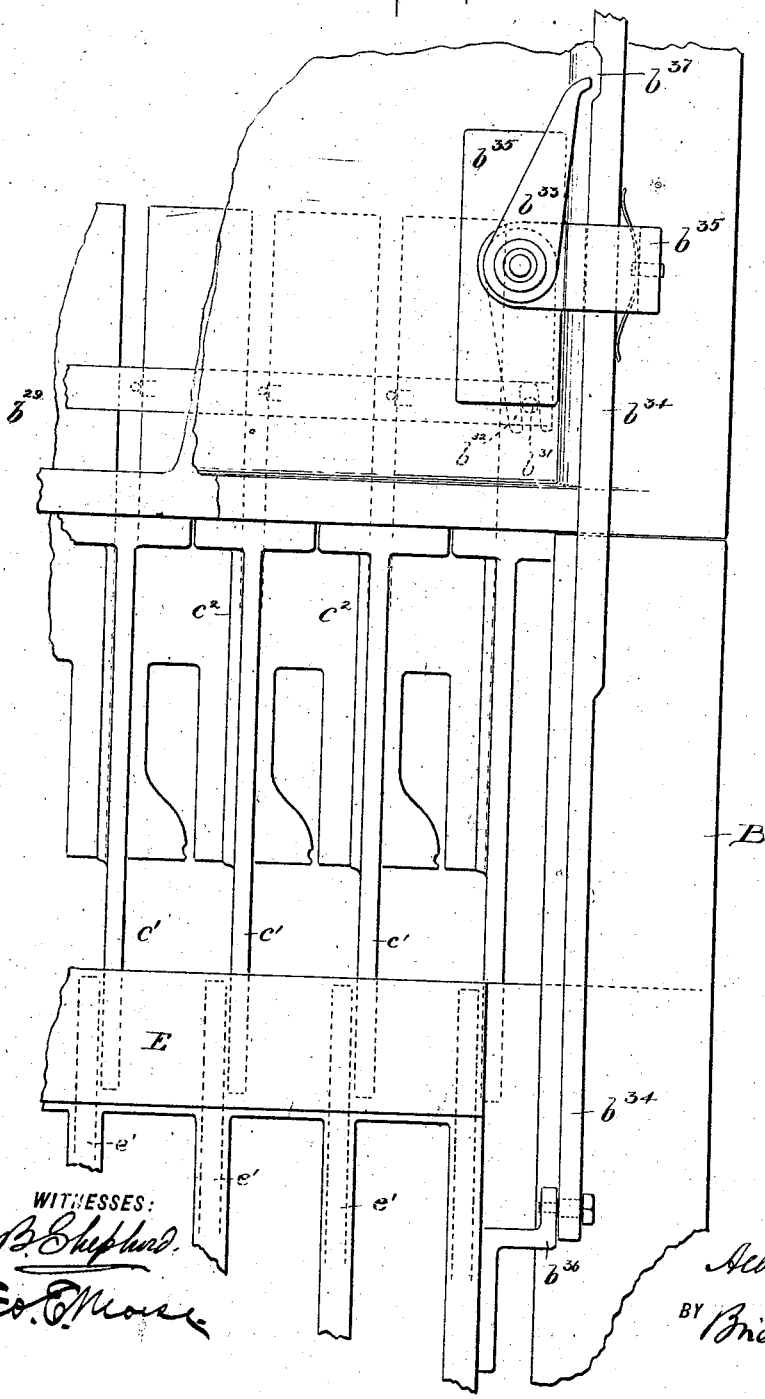

(No Model.)
A. BALL.
MACHINE FOR BUNDLING WOOD.
No. 586,944. Patented July 20, 1897.
12 Sheets—Sheet 10.
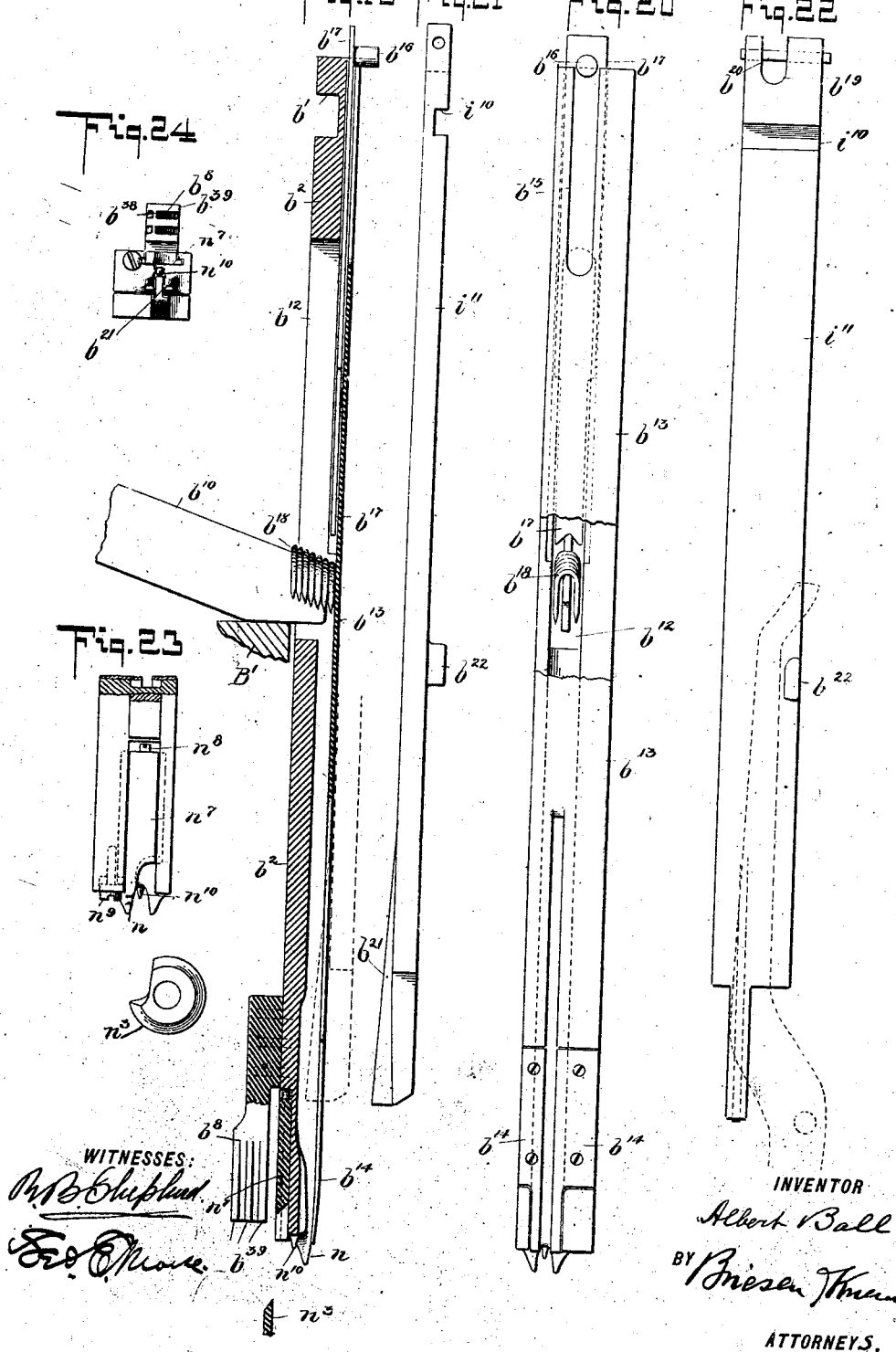
WITNESSES:
INVENTOR
Albert Ball
BY
ATTORNEYS.

(No Model.)

A. BALL.
MACHINE FOR BUNDLING WOOD.

No. 586,944.

Patented July 20, 1897.

WITNESSES:

INVENTOR
Albert Ball
BY
ATTORNEYS.

(No Model.)
12 Sheets—Sheet 12.
A. BALL.
MACHINE FOR BUNDLING WOOD.
No. 586,944.
Patented July 20, 1897.
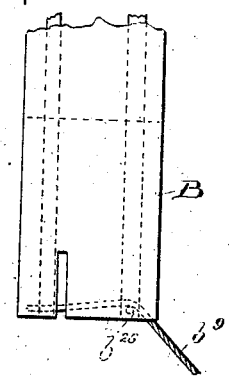
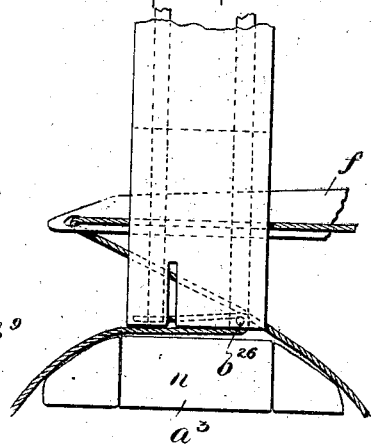
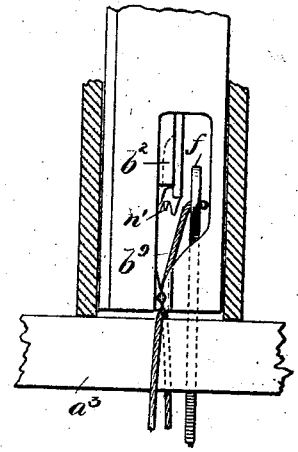
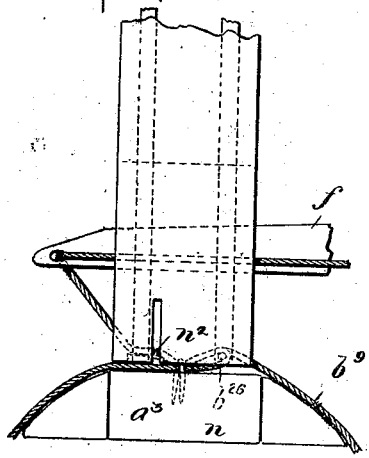
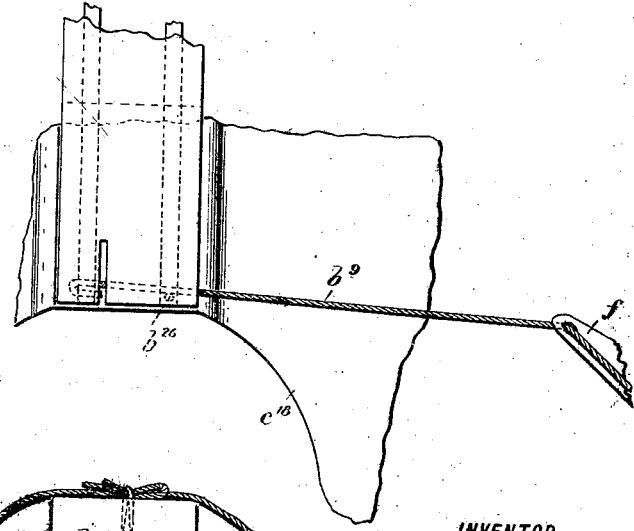
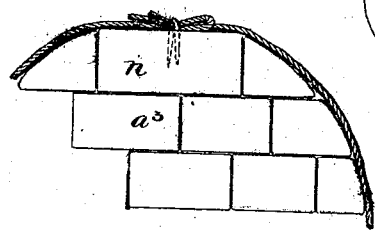
WITNESSES:
INVENTOR
Albert Ball
BY
ATTORNEYS.

UNITED STATES PATENT OFFICE.

ALBERT BALL, OF CLAREMONT, NEW HAMPSHIRE, ASSIGNOR TO THE SULLIVAN MACHINERY COMPANY, OF SAME PLACE.

MACHINE FOR BUNDLING WOOD.

SPECIFICATION forming part of Letters Patent No. 586,944, dated July 20, 1897.

Application filed February 10, 1896. Serial No. 578,671. (No model.)

*To all whom it may concern:*

Be it known that I, ALBERT BALL, a resident of Claremont, Sullivan county, State of New Hampshire, have invented certain new and useful Improvements in Machines for Bundling Wood, of which the following is a specification.

My invention relates to machines for bundling wood, and has for its object to produce a machine which will compact the wood or other objects into a bundle and pass a binding-cord or its equivalent around the bundle and secure the ends of the cord in order to securely bind the bundle.

To these ends my invention consists in the construction hereinafter set forth, and particularly pointed out in the claims.

Broadly speaking, the form of my invention which I have illustrated consists of a device for compacting the wood into bundles, a cord-carrier for passing the cord around the bundles, driving-boxes for holding the free end of the cord and for setting a fastener over the ends of the cord and for severing the cord, together with devices for imparting the proper motion to the parts aforesaid and for effecting the starting and stopping of the machine.

Figure 1:
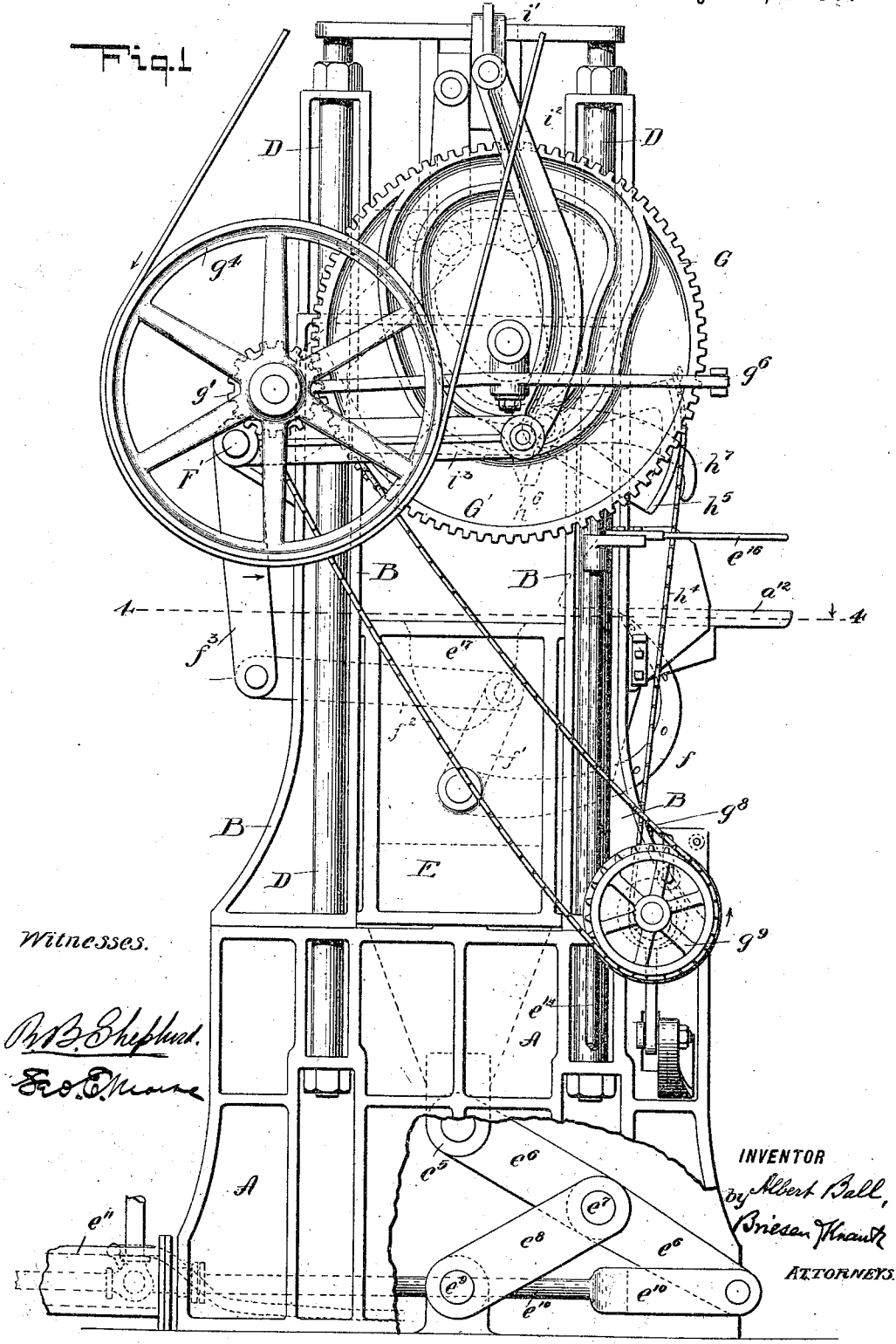
Figure 2:
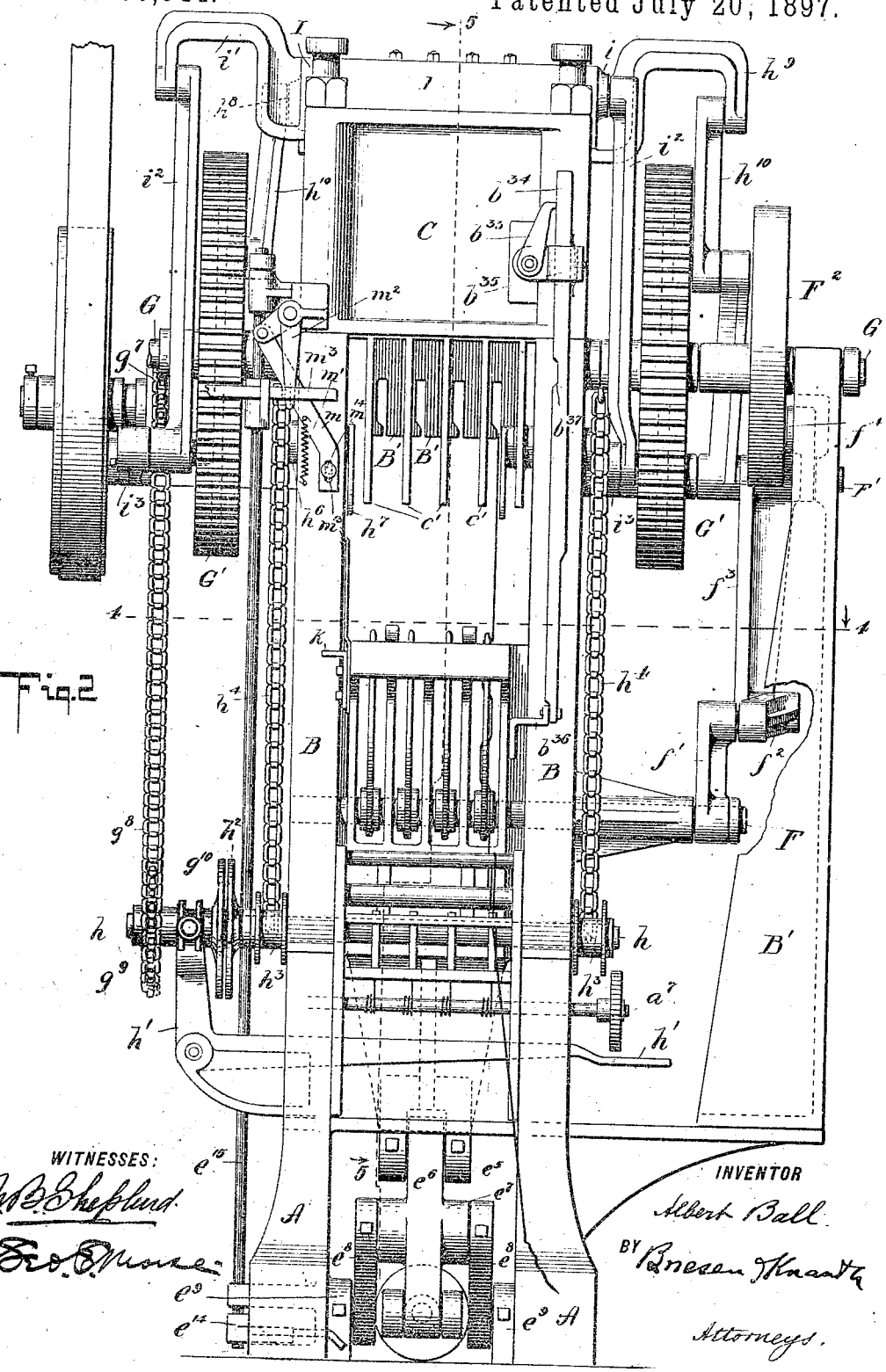
Figure 15:
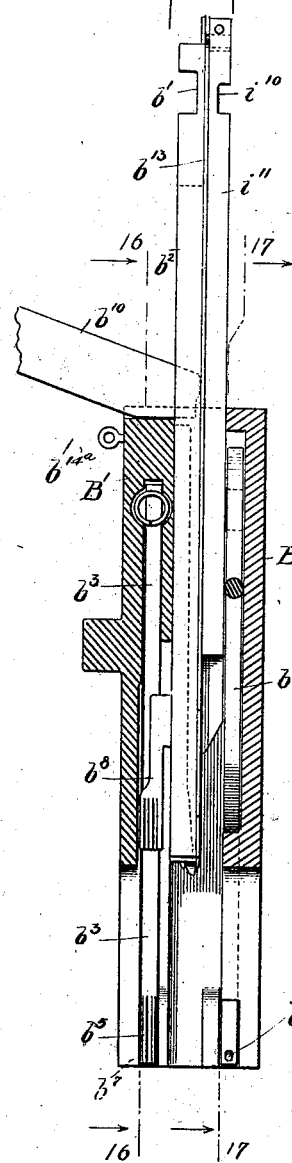
Figure 16:
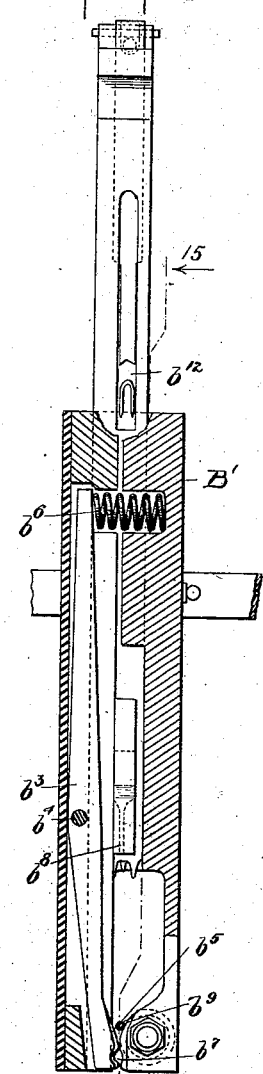
Figure 17:
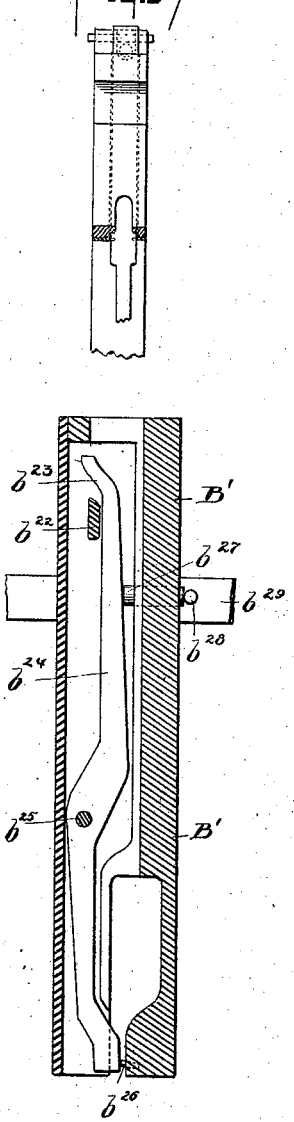
Figure 18:
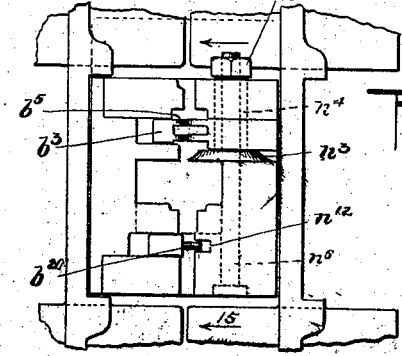
Figure 25:
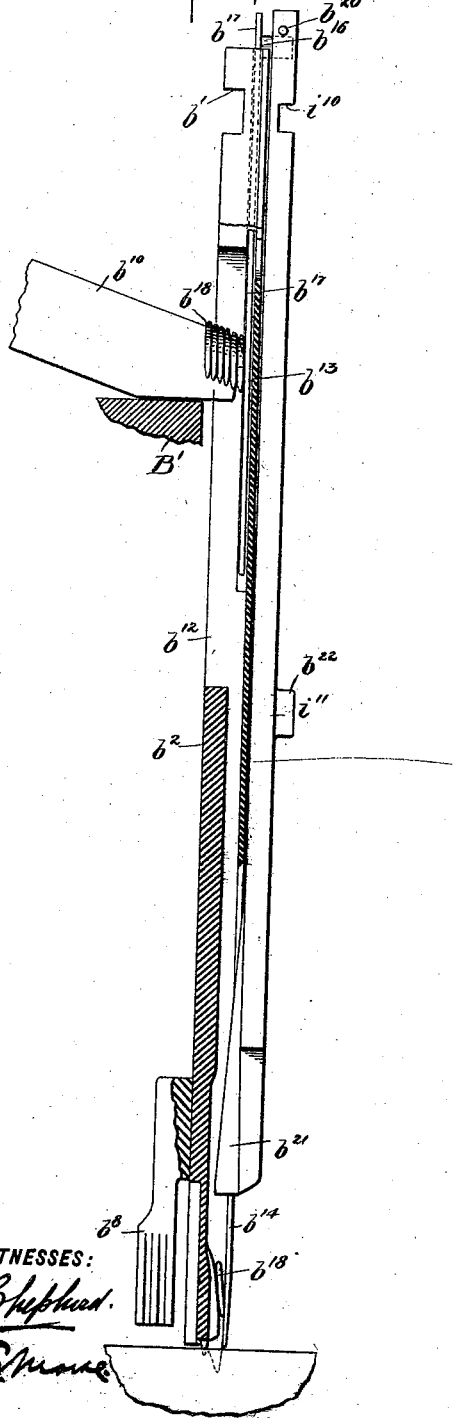
Figure 26:
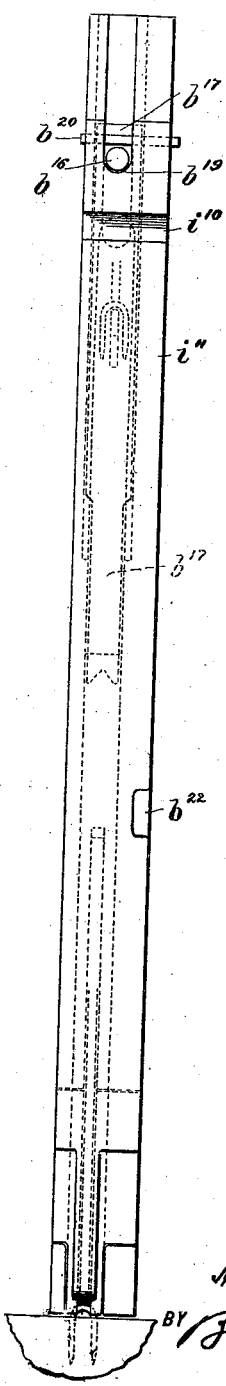

In the accompanying drawings, which illustrate a machine embodying the principles just set forth and in which like letters of reference refer to like parts throughout the several views, Figure 1 is an elevation of the left-hand end of the machine, a portion of the lower frame being broken away to show the toggles for advancing the movable cross-head. Fig. 2, Sheet 2, is a front elevation of the same. Fig. 3, Sheet 3, is a plan view of the machine. Fig. 4, Sheet 4, is a horizontal section of the machine, taken on line 4 4 of Fig. 2 and showing the movable cross-head in plan view. Fig. 5, Sheet 5, is a vertical section of the machine on line 5 5 of Fig. 2, the driving mechanism being omitted and the movable cross-head and needle being shown as retracted. Fig. 6, Sheet 6, is a vertical section similar to that of Fig. 5, showing the movable cross-head as advanced and compacting the wood and the needle in the act of passing the cord around the bundle. Figs. 7, 8, 9, 10, and 11, Sheet 4, Fig. 13ª, Sheet 3, and Figs. 12 and 13, Sheet 7, illustrate the hand starting and automatic stopping devices for the machine, the said devices being drawn to a larger scale than the preceding figures. Fig. 14, Sheet 7, is a detached vertical section of the machine on line 5 5 of Fig. 2, the said figure being drawn to a larger scale and exhibiting a driving-box and its connected mechanisms, as will be more fully described hereinafter. Fig. 15ª, Sheet 9, is a detached front elevation of the upper portion of the machine shown in Fig. 2, the said figure showing the cross-heads and part of the cord-releasing mechanism. Fig. 15, Sheet 8, is a sectional view of one of the driving-boxes. Fig. 16 is a section on line 16 16 of Fig. 15, the view being taken in the direction of the arrow, which is at right angles to the direction of view in Fig. 15, and exhibits in detail one of the cord retaining or holding devices. Fig. 17 is a section on line 17 17 of Fig. 15, looking in the direction of the arrow, which is also the direction of view of Fig. 16 and shows in detail the other cord-retaining device. Fig. 18, Sheet 8, is a view of a driving-box, looking from below, and specially illustrates the cord retaining and cutting devices. Fig. 19, Sheet 10, is a detail sectional view of the "grip-bar," so called. Fig. 20 is a broken-away elevation thereof, looking in a direction at right angles to the direction of view in Fig. 19. Fig. 21 is a front view of the driving-bar which fixes the staple which holds the ends of the cord. Fig. 22 is a side view of the driving-bar, the direction of view being at right angles to the direction of view in Fig. 21. Fig. 23 is a broken-away detail view of the lower end of the grip-bar, showing also the cutting-wheel which coöperates with a cutter on the grip-bar to sever the cord, which cutting-wheel is carried in the lower end of the driving-box, as will be apparent from an inspection of Fig. 18, Sheet 8. Fig. 24, Sheet 10, is a view of the lower end of the grip-bar shown in Figs. 19 and 23, the direction of the view being upward. Fig. 25 is a sectional view of the driving and grip bars, which are shown in Figs. 19, 20, 21, 22, 23, and 24 in their operative relations. Fig. 26 is a view of the same parts, the direction of view being at right angles to the direction of view in Fig. 25. Fig. 27, Sheet 12, is a side view of the lower end of a driving-box, showing the cord retained therein and the position which it assumes when the machine is at rest and before the bundle has been placed therein. Fig. 28 is a similar view of the end of the driving-box, showing a portion of the bundle and the needle and cord after the bundle has been raised to its highest position by the movable cross-heads and the needle is at one extremity of its throw. Fig. 29 is a rear view of the mechanism shown in Fig. 28. Fig. 30 is a view of the parts shown in Fig. 28 after the staple has been driven by the driving-bar and the cord cut ready for removal of the bundle. Fig. 31 shows the same parts in a different position, the needle having been withdrawn and the bundle lowered by the retraction or withdrawal of the movable cross-head.

In the drawings, A A, Figs. 1, 2, and 3, represent the lower frame of the machine and the I-beams C C the upper portions of the frame, all being held firmly together by heavy tie-bolts D D, made to withstand a strain of several tons. The middle portion of the frame consists of two inverted-U-shaped castings B B, Fig. 5, whose vertical sides are finished on the four inner corners, Fig. 4, to form sliding-ways for a cross-head made in form of a rectangular vessel E, having four vertical walls and a bottom, Figs. 4 and 5, upon the front and rear walls of which are constructed vertical sliding-ways $e\ e$, provided to retain from lateral movement a series of strong presser-plates $e'$, made of steel or other suitable material. These plates rest upon caps $e^2$, which have extending downward through the bottom of the cross-head E bolts $e^4$, provided with lock-nuts. Between the caps $e^2$ and the bottom of the cross-head are powerful springs $e^5$, whose tension may be regulated by the lock-nuts on the bolts $e^4$.

The presser-plates $e'$ are provided with U-shaped openings $e^{17}$ in their upper portions. Into these openings is to fit the bundle of wood to be compressed and bound, and the form of the openings is to be that of the lower portion of the cross-section of the bundle and may have any convenient form. In the present case it is a half-oval.

In the side walls of the cross-head E are bearings for a shaft F, Fig. 4, which carries secured thereto a series of swinging needles or cord-carriers $f$, Fig. 5, which carry the binding-cord. The shaft F passes through slots in the presser-plates $e'$ without touching them.

To the right-hand end of the shaft F a crank $f''$ is attached, which is connected by a link $f^2$ to a bell-crank $f^3$, which swings upon a rock-shaft or axle F'. This bell-crank $f^3$ is provided at the end of its upper arm with a friction-roller $f^4$, which engages a cam $F^2$, Fig. 2, secured to a shaft G, which is supported by and rotates in three bearings—one on the extreme right of the machine in a stand-bracket B', the other two in the castings B. Carried upon the shaft G, secured thereon on either side of the machine, are two double-cam gears G' G', exactly alike and so placed that the line of greatest throw of each lies in the same axial plane and like cams face in the same direction. These two gears G' are driven by two identical spurs $g'$ $g'$, Fig. 3, secured to a shaft $g^2$, which rotates in bearings attached at casting B. On the left-hand end of the shaft $g^2$ and prevented from slipping therefrom by a collar $g^3$ is the driving-pulley $g^4$, which rotates idly upon the shaft $g^2$ when the machine is at rest, but which, by means of a shifting lever $g^6$, may engage a clutch $g^5$, one part of which is secured to the left-hand spur $g'$ and the other to the driving-pulley $g^4$, thus rotating the spurs $g'$ $g'$ and thus engaging cam-gears G' G' and the shaft G, to which they are secured, together with the cam $F^2$.

Carried on the hub of the driving-pulley $g^4$ is a sprocket-wheel $g^7$, engaging a chain $g^8$, which in its turn engages another sprocket $g^9$, Figs. 1 and 2. This sprocket is secured to or made a part of the hub of a friction-disk $g^{10}$, which rotates freely upon a shaft $h$ and may be slid along this shaft by means of a shifting-crank $h'$, so as to engage another friction-disk $h^2$, which is securely fastened to the shaft $h$. This shaft passes through and has bearings in the casting B and has secured to it, outside and on either side of the frame, winding-sheaves $h^3$, which engage two chains $h^4$. These chains (see Fig. 1) are fastened to arcs $h^5$, which are secured to short shafts $h^6$, each of which passes through bearings in the casting B toward the central portion of the machine, Fig. 2, and has secured to its inner end a bundle-retaining hook $h^7$. These hooks $h^7$ serve to retain the bundle of wood in proper position to be bound, as shown in Fig. 5, until the cross-head E is raised to its upper position, as shown in Fig. 6, as will be more fully explained hereinafter.

Projecting downward from and securely bolted to the lower flanges $c$ of the I-beams C is a series of stationary upper presser-plates $c'$, Figs. 5 and 15$^a$, Sheet 9. These plates have an opening $c^{18}$ in their lower portions conforming to the shape of the bundle of wood, in the present case semicircular. (See Figs. 5, 6, and 31.) They are also provided with openings $e^{18}$, through which the cam-shaft G passes without touching. The distance apart of these plates $c'$ and also of the lower plates $e'$ is the length of the pieces of wood in the bundles after they are sawed apart. They are so placed also that when the cross-head E is raised the plates $e'$ will overlap the plates $c'$, as shown in Fig. 15$^a$. These plates $c'$ are provided with vertical parallel beads $c^2$, which constitute retaining-ways for as many driving-boxes B' as there are to be binding-cords on the bundle, which may be any convenient number. In the machine illustrated, which is much shortened on account of limited space, there are but four. It is usual, however, to employ sixteen. These boxes, of which enlarged views are seen on Sheet 7, are provided with lugs $b$, which rest upon the lower flange $c$ of the I-beam C and are prevented from vertical movement by clips $c^3$, which are wide enough to hold down two boxes each. (See Fig. 3.)

Referring to Fig. 5, pivoted to the end webs of the I-beams C are two vertical bars $c^4 c^4$. There are two more at the left of the machine, (not shown,) the four forming guides for two horizontal beams H I, whose offices will be explained hereinafter. The guides $c^4$ are held in a vertical position by a strap $c^5$, which fits over pins or legs on the top of $c^4$ and is itself held firmly in place by fitting over the reduced upper ends of the tie-bolts D. There is a similar construction on the left, as seen in Fig. 3.

The beams H and I are moved up and down in a horizontal position and must therefore be moved at each end in the same direction and to the same extent.

Referring to Fig. 2, we will notice that the beam I is provided on the right with a boss $i$ and on the left with a strong projecting hook $i'$. Hanging downward from $i$ $i'$ are two links $i^2$ of exactly the same length, which are provided with friction-rollers at the ends, which engage the left-hand faces of the two double-cam gears G′ G′. The swing of these rollers is determined by two cranks $i^3$, Figs. 1 and 2, which are pivoted on the axle F′.

As the cams G′ G′ are exactly alike and are secured to the same shaft G, it follows that the beam I, guided vertically by the guides $c^4 c^4$, will move up and down as the cams revolve, always remaining in a horizontal position. In like manner the beam H is provided with a boss $h^8$ and a hook $h^9$ like those on beam I, but reversed in position. Hanging from these are links $h^{10}$, provided at their lower ends with friction-rollers engaging the right-hand faces of the cam-gears G′. The swing of these rollers is regulated by two cranks $h^{11}$, which are pivoted on the axle F′. Thus the beam H is given an up-and-down movement, according to the throw of the cam, always keeping in a horizontal position.

The beam H is provided with a bead or lip $h^{12}$, Figs. 3 and 5, which engages notches $b'$ in a series of sliding bars $b^2$, which will be hereinafter referred to as "grip-bars."

Upon the beam I, which I designate the "driving-beam," extending toward the front, are a series of brackets $i^5$, having at the forward ends downwardly-projecting hooks $i^6$, in which rest the ends of small bars $i^7$, through which pass bolts $i^8$, which extend up through the beam I and are retained by nuts above the beam. Between the beam and these bars, Fig. 5, Sheet 5, and Fig. 14, Sheet 7, are powerful springs $i^9$. The ends of these bars $i^7$ engage notches $i^{10}$ in a series of sliding bars $i^{11}$, which I will designate as "driving-bars."

Let it be understood that the binding of the bundle is not accomplished by knotting the cord, but by setting a staple or other fastener over the cord at the lap and then cutting the cord, thus forming a fastening, as clearly exhibited in the lower part of Fig. 31, Sheet 10.

I will now proceed to describe the interior construction of the boxes B′, in each of which is contained a grip-bar $b^2$ and a driving-bar $i^{11}$.

Fig. 15, Sheet 8, shows an enlarged view of this box, looking in the same direction as in Fig. 5, having the side cut away flush with the sliding grip and driving bars $b^2$ and $i^{11}$, respectively. Fig. 16 is a section of Fig. 15 on the line 16 16, looking in the direction of the arrows. Here is seen a cord-retainer consisting of lever $b^3$, pivoted at $b^4$, having two pins or teeth $b^5$ near its lower end which are pressed, by means of a spring $b^6$, against a similar number of pins or teeth made in the lower portion of the box itself. In the lower portion of these teeth are notches $b^7$, corresponding to notches in the teeth of the box. These teeth are seen clearly in Fig. 18, which is a bottom view of the box, looking from below.

In Fig. 15, projecting from the lower part of the grip-bar and then bent downward, is a separator-bar $b^8$, channeled to form a series of wedges $b^{33}$ between lands $b^{39}$. (Seen more clearly in Figs. 19 and 24, Sheet 10.) The lands of this separator-bar are made to slide between the teeth of the lever $b^3$ and the box itself and to push them slightly apart.

When the cord occupies the position shown at $b^9$, Fig. 16, and the grip-bar $b^2$ begins to descend, the separator-bar $b^8$ will press the cord down till it reaches the notches $b^7$, where it will be firmly held by the pressure of the spring $b^6$.

In Fig. 5 will be seen an inclined fastener-carrier $b^{10}$, passing through a slot $b^{11}$ in the rear of I-beam C. This bar rests in a slot in the upper part of the box B′ and passes entirely through an elongated opening $b^{12}$ in the grip-bar $b^2$ (see Sheets 9 and 10) and is pressed by a spring $b^{14}$ against the inner face of a plate $b^{13}$, which is secured to the inner face of the grip-bar $b^2$. The grip-bar $b^2$ and the driving-bar $i^{11}$ are made to slide in vertical ways provided in the box B′ and against themselves, which contiguous slides are finished for the purpose.

The plate $b^{13}$ has a mortise in the lower end, which mortise is continued between two springs $b^{14}$, (see Fig. 20,) which serve to maintain the staples in position to be struck by the driving-bar. In the upper part is a slot $b^{15}$ to allow the passage of a pin $b^{16}$, fastened to a staple-feeder or thin wedge $b^{17}$, whose upper part is wider than the opening $b^{12}$ and slides in small rabbets against the plate $b^{13}$, while the lower part is narrower than the opening $b^{12}$ and moves within it. When the driving-bar is in position in contact with the grip-bar, as seen in Fig. 26, Sheet 11, the pin $b^{16}$ is held firmly in a slot $b^{19}$ by a cotter $b^{20}$ (see Figs. 20 and 22) in the upper part of the bar $i^{11}$, and therefore the wedge $b^{17}$ must move with the driving-bar and independent of the grip-bar. The construction of the lower part of this driving-bar is clearly exhibited in Figs. 21 and 22. A web $b^{21}$ is made to slide within a slot in the plate $b^{13}$ and between the springs $b^{14}$. The driving-bar is also provided with a lug $b^{22}$, which engages a cam $b^{23}$, Fig. 17, Sheet 8, on a lever $b^{24}$, which is pivoted to the box B' at $b^{25}$. The lower end of this lever $b^{24}$ has a pin $b^{26}$, which passes freely into a socket in the box B' and serves as a retainer for the cord, as will be more clearly understood hereinafter. This lever $b^{24}$ is held in position by the lug $b^{22}$ and a pin $b^{27}$, which moves in a smooth hole in the box B' and is itself held in place by a pin $b^{28}$, projecting from a rod $b^{29}$, Fig. 14, Sheet 8, which slides horizontally in guides $b^{30}$, fastened to the lower web $c$ of the I-beam C. The right-hand end of this rod $b^{29}$ contains a pin $b^{31}$, which engages the slotted end of a lever $b^{32}$, which, with another lever $b^{33}$, is secured to a rock-shaft $b^{40}$, passing through bearings in the main web of the front I-beam C, Fig. $15^a$, Sheet 9. In Fig. 2 the upper end of this lever $b^{33}$ is seen resting against an upright rod $b^{34}$, which slides through an opening in a bracket $b^{35}$ and has its lower end pivoted to a bracket $b^{36}$, secured to the cross-head E. The rod $b^{34}$ has a notch $b^{37}$, which registers with the end of lever $b^{33}$ when the cross-head E is in its upper position, for purposes which will appear hereinafter, Fig. $15^a$.

The inclined staple-carrier bar $b^{10}$ carries a number of staples $b^{18}$, the inclination of the bar, combined with the weight of the staples, serving to keep the lowermost staple pressed lightly against the plate $b^{13}$ in such a position as to be engaged by the wedge $b^{17}$ in its downward movement and pushed past the nose of the bar, when it will be free to drop through an opening between the plate $b^{13}$ and the rear of the grip-bar until it is caught by the spring $b^{14}$ in the position shown in Fig. 25, Sheet 11. The shape of the nose of the bar $b^{10}$ is clearly shown dotted in Figs. 19 and 31.

Let it be clearly understood that box B' (of which only a small fragment is shown in section) and the staple-carrier bar $b^{10}$ are fixed objects, while the grip-bar $b^2$ and the driving-bar $i^{11}$ are vertically movable by the grip-beam H and the driving-beam I, Fig. 5, respectively; and while it would appear by a casual glance at Figs. 19 and 31 that the box B' and the bar $b^{10}$ had moved upward, in reality they have remained stationary, while the other parts shown in the figure must be understood to have moved downward.

Both beams H and I move down together, carrying with them the grip-bar $b^2$ and the driving-bar $i^{11}$ until the latter reaches the positions shown in Fig. 25, when the grip-bar stops and enters its prongs into the wood and grips the cord. The driving-bar moves on. Just before the two reach the position shown in Fig. 25 one of the staples has dropped against the springs $b^{14}$ in such a position that when the driving-bar $i^{11}$ continues to descend the web $b^{21}$ will strike the staple squarely on the top and drive it into the wood, as shown in Fig. 26, holding down the cord, as shown in Fig. 31.

Referring to Figs. 1 and 2, the cross-head E is seen to have extending downward from the bottom a bearing $e^5$, to which is pivoted a lever $e^6$, which carries at its middle a heavy hub $e^7$, through which passes a stout rock-shaft, to each end of which is secured a link $e^8$, whose length is exactly half the length of the lever $e^6$. These links $e^8$ are pivoted to the frame A at points $e^9$ in such a manner that the axes of $e^9$ (which are coincident) and $e^5$ are in the same vertical plane. To the lower end of lever $e^6$ is pivoted a horizontal piston-rod $e^{10}$, which has its head in a cylinder $e^{11}$, Fig. 3, so that by admitting water or other fluid in front of the same the rod $e^{10}$ is drawn to the rear and the cross-head E is raised in its ways to the position shown in Fig. 6.

A three-way valve of ordinary construction, controlled by a lever $e^{12}$, may admit the fluid to or let it out of the cylinder $e^{11}$. This lever $e^{12}$ has pivoted to it a rod $e^{13}$, which extends under the machine and is pivoted at nearly a right angle to a lever $e^{14}$, which is secured firmly to a vertical rod $e^{15}$, (see Fig. 2, Sheet 2, and Fig. 7, Sheet 4,) which may move in bearings attached to the lower frame A and the upper I-beam C.

At some convenient point of the rod a starting-lever $e^{16}$, Figs. 1 and 3, is secured, so that pushing the lever to the left will rock the rod $e^{15}$, and through the lever $e^{14}$ and connecting-rod $e^{13}$ the valve will be opened and the cross-head E begin to rise.

Fastened to the left-hand side of the projecting front of the cross-head E, Fig. 2, is a small bracket $k$. The upward path of this bracket intercepts the lower end of a flat bar $m$, which has a slot $m^{13}$ at or near its lower end, through which passes a tap bolt or stud $m^{14}$, screwed into the frame. A spring $m'$, fastened to the bar $m$ and the casting B, keeps the bar in its lowest position, pressing the top of the slot against the stud $m^{14}$. When the cross-head rises and the bracket $k$ meets the bar $m$, it pushes it upward a small space, thus rocking a bell-crank $m^2$, to which it is pivoted, so that the downwardly-projecting arm of this bell-crank $m^2$ will push to the left a horizontal bar $m^3$, Fig. 3, which is pivoted to the end of the shifting lever $g^6$, before mentioned. This lever is swiveled to a hub $m^4$, which carries the shaft through its center, but is kept pressed against the hub of the left-hand double cam-gear G by a spring $m^5$, compressed between the hub $m^4$ and a washer $m^6$, held on the shaft G by a cotter. The horizontal rod $m^3$ passes through a slot in a lever $m^7$, which is secured to the vertical rocking rod $e^{15}$. On Sheets 4 and 7 will be found Figs. 7, 8, 9, 10, 11, 12, and 13, which fully illustrate the action of this starting and stopping device.

Upon the inner side of the cam-gear G' is a double cam C', (seen in Figs. 10 and 11,)

which has a cam $m^9$ to act upon lever $m^7$ and a cam $m^{10}$ to act upon a projection $m^{11}$ upon the horizontal rod $m^3$. A spring $a$ between the bar $m$ and the rod $m^3$ tends to keep the bar $m^3$ pressed against the crank $m^2$.

The first effect of moving the starting-lever $e^{16}$ to the left is to bring the parts into the position shown in Fig. 8. The motion of the lever $m^7$ is limited to the extremes shown in Figs. 7 and 8, the limits being the pin $a'$ on lever $m^3$ and the stop $m^8$, Fig. 11, on cam C'. This movement opens the fluid-valve and the cross-head E rises, all the rest of the machine remaining stationary. Just before the cross-head reaches its highest position, Fig. 2, the bracket $k$ pushes up slightly the bar $m$, rocks the bell-crank $m^2$, moving the rod $m^3$ to the left, thus operating the shifting lever $g^6$, Fig. 3, thereby starting the cam-shaft G with its various cams. At the instant of starting the parts shown in Figs. 7 and 8, Sheet 4, are brought into the positions shown in Fig. 9, in which they are held firmly by the crank $m^2$ until the cam gear-wheel G' has made nearly one complete revolution, bringing the cam $m^{10}$, Fig. 12, Sheet 7, into contact with the pin $m^{11}$ on the bar $m^3$, thus pushing this bar forward till it is out of engagement with the crank $m^2$, and holding it out of engagement until the cam $m^9$, Fig. 13, has pushed the mortised lever $m^7$ to the right, carrying with it, by means of the pin $a'$, the lever $m^7$, when the bar $m^3$, released from connection with the cam $m^{10}$, will be pressed, by means of spring $a$, against the crank $m^2$, as clearly shown in Fig. 13$^a$, Sheet 3. This operation simultaneously uncouples the driving mechanism by means of lever $g^6$ and opens the exhaust-valve by means of lever $m^7$ and connected mechanism, thus stopping the supply of fluid to the cylinder $e^{11}$, when the cross-head E will begin to descend, the bracket $k$, Fig. 2, will release its upward pressure against the bar $m$, which will be drawn down by the spring $m'$, thus rocking the bell-crank $m^2$ and bringing it into position to engage the notch in the bar $m^3$, as clearly shown in dotted lines in Fig. 13$^a$, when the parts will be restored to the positions shown in Fig. 7, Sheet 4.

The binding-cord $b^9$, Fig. 5, which may come from any convenient place, passes under a series of fingers $a^4$, which are pressed against a bar $a^5$ by a series of coiled springs $a^6$, the tension of which may be regulated by turning the shaft $a^7$, about which the springs are coiled and to which they are fastened. This shaft is provided with a ratchet-wheel $a^8$ on the right, Fig. 2, and a pawl $a^9$ to keep the tension, Fig. 5. The cord then passes up around a roller $a^{10}$, then down around a movable roller $a^{11}$, whose ends move in vertical slots $a^{12}$. The weight of this roller bears upon the slack of the cord between the roller $a^{10}$ and the first eye of the needle $f$. The cord passes through four eyes in the needle $f$, and when the machine is at rest it assumes a straight line from the last eye to the driving-box, as shown by a dotted line in Fig. 5. In Fig. 27, Sheet 12, will be seen the position this cord takes on entering the driving-box B', the retaining-pin $b^{26}$ holding the cord on the right and the lever $b^3$, Fig. 16, Sheet 8, holding it on the left.

In the lower part of the driving-box B' is a cutter $n^3$, held firmly in place by being pressed against the box by a washer $n^4$ by a nut $n^5$ on the end of a bolt $n^6$, which passes through box, cutter, and washer. The form of the shearing cutter is seen in Fig. 23, where it is shown in position with reference to the other shear in the grip-bar $b^2$. This cutter is an adjustable plate $n^7$, sliding in ways and flush with the rear face of the bar and adjustable by two screws $n^8$ $n^9$. The clip $n'$, (see Fig. 19,) which grips the cords, is also provided with a stout pin $n^{10}$, which is found to hold the cords more surely from slipping by crowding them more effectually. A bottom view of the two bars $b^2$ and $i^{11}$ in position with reference to each other is seen in Fig. 24, which also more clearly exhibits the toothed wedge $b^8$.

From the time that the preliminary bundle is placed on the skids until the staple is driven the cord $b^9$ must be held firmly by the retaining-pin $b^{26}$ on the end of lever $B^{24}$, Fig. 17, Sheet 8, and immediately the staple is driven this pin $b^{26}$ must be withdrawn that the bundle may retire freely.

The nose of the lever $b^{33}$, Fig. 2, is kept from moving to the right by the bar $b^{34}$ until the cross-head E is raised. Thus the bar $b^{29}$, Fig. 15$^a$, Sheet 9, is kept from moving to the left, and the pin $b^{27}$, Fig. 17, therefore keeps the lever $b^{24}$ from moving. As soon, however, as the bundle is in place and the cross-head raised the pull on the pin $b^{26}$, Fig. 28, Sheet 12, is to the rear, thus holding it firmly against the side of its housings $n^{12}$, Fig. 18, Sheet 8, and the cord holds the pin instead of the pin holding the cord, as before. The cross-head having ascended, Fig. 15$^a$, Sheet 11, the notch $b^{37}$ in the bar $b^{34}$ is brought opposite the nose of lever $b^{33}$. The cord is holding the pin $b^{26}$ in its loop while the cams are revolving. As soon as the driving-bar $i^{11}$ has driven the staple it returns to about the position shown in Fig. 25, (see also Fig. 17, Sheet 8,) but it does not stop there, but goes up a little farther till the lug $b^{22}$ strikes the cam $b^{23}$ on the top part of the lever $b^{24}$. The pin $b^{27}$ is now free to move, and therefore the lever $b^{24}$ will be rocked, the loop released, and the bar $i^{11}$ will return to the position indicated by the lug $b^{22}$, which is that shown in Fig. 15. This operation has moved the bar $b^{29}$, Fig. 15$^a$, Sheet 9, to the left and pushed the nose of lever $b^{33}$ into the notch $b^{37}$ of the bar $b^{34}$. Immediately after this, however, cam C', Fig. 7, Sheet 4, actuates the stopping mechanism and opens the valve to the power-cylinder, and the cross-head E, Fig. 15$^a$, descends, taking with it the bar $b^{34}$, and the cam at the top of the notch $b^{27}$ will force the nose of lever $b^{28}$ to the left, thus bringing back the bar $b^{23}$ to the position shown in Fig. 17, and the pin $b^{26}$ is held in position to retain the cord from the receding needle, as seen in Fig. 31, Sheet 10.

Having now described all the different parts of the machine with their functions, I will now proceed to show the successive operations that take place during the working of the machine.

The pieces of wood used in this machine may be of any convenient uniform cross-section throughout their lengths, which should all be the same and such as to enter the limits prescribed by the machine, which lengths may be different for different machines. In the present one I have provided for short pieces on account of limited space.

Supposing the bits of wood in the finished bundle to be three inches in length, the pieces for the unsawed bundle to be bound will be a little over twelve inches. These may be first tied into a bundle shaped somewhat like the cross-section $a^8$, Fig. 5. This bundle is placed upon the skids $a^{12}$ and pushed against the cords $b^9$ until it is far enough under the hooks $h^7$ to be caught by them when they are swung. The position of the hooks $h^7$ when the machine is at rest is seen in Fig. 1 in full lines and dotted in Fig. 5. The operator, Fig. 2, then presses down the shifting handle $h'$, which causes the disk $g^{10}$ to engage by friction the disk $h^2$, revolving the shaft $h$ with its sheaves $h^3$, thus winding up the chains $h^4$, swinging the arcs $h^5$, Fig. 1, and the shafts $h^6$, with the retaining-hooks $h^7$, Fig. 5, which latter will push the bundle along the taut cords $b^9$ until it is fitted snugly in the openings in the presser-plates $c'$, as clearly shown in full lines.

In making the preliminary bundle one piece of wood $n$, usually stouter than the rest, is made to occupy a position at the top, as shown on Sheet 10, in order that the staples will have a firm bed.

While the bundle is held firmly by the hooks $h^7$ and without releasing the friction-handle $h'$, the starting-lever $e^{16}$ is pushed to the left, which causes the cross-head E to rise, as already explained, until the lower presser-plates $e'$ have engaged the bundle, when the shifting handle $h'$ may be released, causing the hooks $h^7$ to return to their former positions, as in Fig. 1. This return is made by counterbalancing-weights. (Not shown.)

The compression of the bundle between the presser-plates $e'$ and $c'$, caused by the toggle below the cross-head E, may be varied by the pressure against the piston, but should be considerable. In the present machine it is many tons.

Let it be borne in mind that the cams are not set in motion until the cross-head E has nearly reached the upper limit of its throw. Hence the bell-crank $f^3$, Fig. 5, remains stationary, and around its lower end as a center the link $f^2$ will therefore swing as the cross-head ascends, which will cause the crank $f'$ to rock the needle-shaft F, and with it the needles $f$, until they assume the position shown in Fig. 6, at which instant the cams are started and the motion of the shaft F continued until the parts assume positions shown dotted in this figure.

Figs. 28 and 29, Sheet 12, show detail views of the lower ends of the driving-boxes at the instant of greatest upward throw of the needle. The grip-bar $b^2$ now descends, grips the cords below it in the clip $n'$, at the same time cutting the top one, as shown at $n^2$ in Fig. 30, after which the driving-bar $i^{11}$ descends and drives in the staple. The grip and driving bars are then drawn back, the cams stopped, the cross-head E retires, carrying with it the bundle properly bound and secured, as seen in Fig. 29. This bundle is thrown out in the rear.

What I claim, and desire to secure by Letters Patent, is—

1. In a bundling-machine, the combination of a bundle-compress having a moving part, means for moving the same, a cord-carrier, a fastener-setter, and means for automatically starting the fastener-setter by the movement of the bundle-compress.

2. The combination of the following instrumentalities in operative relation, to wit: a bundle-compressing mechanism comprising separable compressing members, a bundle-binding mechanism comprising a means for surrounding a bundle with cord or its equivalent and for securing the same, the said compressing and binding mechanisms being distinct and independent mechanisms and means for starting the bundle-binding mechanism from the bundle-compressing mechanism.

3. A bundle-compressing mechanism combined with a bundle-binding mechanism, the said compressing and binding mechanisms being operated by independent means and being distinct and separate from each other and means for starting the bundle-binding mechanism from the bundle-compressing mechanism and for stopping the bundle-binding and bundle-compressing mechanisms by the movement of the bundle-binding mechanism.

4. In a machine of the character described, the combination of a two-part bundle-compress, an arm as $h^7$ for holding the bundle in one part of the compress, operating mechanism for the said arm, and a bundle-binding mechanism.

5. The combination of a two-part bundle-compress, an arm as $h^7$ for holding a bundle in the compress, operating mechanism for the said arm, a cord-carrying device, and a fastener-setter, all combined to operate, substantially as and for the purposes set forth.

6. In a machine of the character described, the combination of a bundle-compress having a movable member, means for moving the same, a cord-carrier actuated by the movement of the movable member of the compress and fastener-setting mechanism, as and for the purposes set forth.

7. In a machine of the character described, the combination of a two-part bundle-compress having a movable member, means for moving the same, a cord-carrying device carried by the movable member of the compress, and a fastener-setting mechanism, all combined substantially as set forth.

8. In a machine of the character described, the combination of a two-part bundle-compress, means for operating the same to compress a bundle, an arm as $h^7$ for holding the bundle in operative relation with one member of the compress, operating mechanism for the said arm, a cord-carrying device carried by one member of the compress, and means for connecting the free ends of the cord in order to complete the binding of the bundle by the cord.

9. In a machine of the character described, the combination of a two-part bundle-compress, means for operating the same to compress a bundle, an arm as $h^7$ for maintaining a bundle in operative relation to one member of the compress, means for operating the said arm, a cord-carrying device to effect the wrapping of the bundle by the cord, fastener-setting mechanism and cord-cutting mechanism, as and for the purposes set forth.

10. The combination of a bundle-compress having a movable member, means for moving the same, a cord-carrying device to effect the binding of the bundle, a fastener-setting mechanism and a cord-cutting device combined with means for starting the fastener-setting mechanism from the bundle-compress.

11. In a machine of the character described, the combination of a bundle-compress consisting of a plurality of members, one of which is movable, means for moving the same, a cord-carrying device carried by one of the members, operating means therefor, and fastener-setting mechanism.

12. In a machine of the character described, the combination of a bundle-compress comprising separable members each consisting of a plurality of sets of presser-plates, a cord-carrying arm, and a fastener-setting mechanism combined for operation, substantially as and for the purposes set forth.

13. In a machine of the character described, the combination of a plurality of sets of presser-plates adapted to effect the compression of a bundle between the plates, a supporting-arm as $h^7$ for the bundle, operating mechanism for the said arm, a cord-carrying device for binding the bundle, and a device for effecting the connection of the ends of the cord surrounding the bundle.

14. In a machine of the character described, the combination of a plurality of sets of presser-plates, one of the said sets being movable, means for moving the same, a cord-carrier carried by one set of presser-plates, and a fastener-setting mechanism.

15. In a machine of the character described, the combination of a plurality of sets of presser-plates, one of the said sets being movable, means for moving the same, a cord-carrying device carried by one of the sets of presser-plates, a supporting-arm as $h^7$ for supporting the bundle, means for moving the said arm, and a staple-driving mechanism.

16. The combination in a machine of the character described, of a compress consisting of a stationary member, a movable member, a moving cross-head carrying the movable member, means for moving the same, a spring interposed between the cross-head and the movable member, whereby the movable member may have free motion in the cross-head, combined with a cord-carrying device, and mechanism for securing the ends of the cord whereby the cord may be made to bind the bundle.

17. In a machine of the character described, the combination of a plurality of sets of presser-plates, one of which sets is movable, means for moving the same, the said movable member being apertured for the passage of a shaft as $F'$, and a cord-carrying device carried by the shaft $F'$ and partaking of the movement of the presser-plates.

18. In a machine of the character described, the combination of a plurality of sets of presser-plates, one of the said sets being movable, a cord-carrying device and a fastener-setting device, the said cord-carrying device and fastener-setting device being started by the movement of the movable set of presser-plates.

19. In a machine of the character described, the combination of fixed and movable presser-plates constituting a bundle-compress, a cord-carrying device carried by the movable presser-plates, a driving mechanism and a connection between the cord-carrying device and the driving mechanism, whereby the cord-carrying device not only partakes of the movement of the movable presser-plates but likewise has an independent movement of its own, and a mechanism for effecting the securing of the ends of the cord which binds the bundle.

20. In a machine of the character described, the following organization of mechanism: a bundle-compress having a fixed and a movable member, a cord-holding device and fastener-affixing device comprising the driving-box $B'$ carrying the said cord-holding and fastener-affixing devices and a cord-carrying device for effecting the binding of the bundle.

21. In a machine of the character described, the following organization of mechanism operating in substantially the manner set forth, to wit: a two-part bundle-compressing device having at least one compressing movable member, the driving-box $B'$, comprising a cord-holding mechanism, a needle or cord carrying arm $b^9$, and mechanism for driving a fastener and a cord-cutting mechanism contained within the driving-box and operated in harmony with the movable member of the compress.

22. In a machine of the character described, the following organization of mechanism operating substantially as and for the purpose described which comprises in operative relation the following instrumentalities, to wit: a bundle-compress, a cord-carrying mechanism, a cord-holding mechanism, an arm as $h^7$ for maintaining the bundle in operative relation with the compress, means for operating the said arm, a fastener-setting mechanism and a cord-cutting mechanism.

23. In a machine of the character described, the following instrumentalities, namely, a stationary set of presser-plates, a spring-mounted set of presser-plates, a cord-carrying mechanism for effecting the binding of the bundle combined with means for fastening the cord around the bundle.

24. In a machine of the character described, the following instrumentalities, namely, a stationary set of presser-plates, a spring-mounted set of presser-plates, a cord-carrying mechanism for effecting the binding of the bundle combined with means for securing the cord around the bundle, and mechanism for cutting the cord.

25. The combination in a machine of the character described, of a stationary set of presser-plates, a movable set of presser-plates carrying a cord-carrying device, an arm as $h^7$ for holding the bundle in the stationary set of presser-plates, means for operating the said arm, a fastener-driving mechanism and means for actuating the before-mentioned cord-carrying device from the movable presser-plates.

26. In a machine of the character described, the combination of a bundle-compress comprising a plurality of members, one of the said members being movable, a swinging cord-carrier carried by one of the members, all combined with means for securing and severing the cord, as and for the purposes set forth.

27. In a machine of the character described, the combination of stationary presser-plates, movable presser-plates, a swinging cord-carrier carried by the movable presser-plates, and means for imparting to the cord-carrier a swinging motion independent of its movement with the presser-plates, all combined with cord-retaining mechanism, and cord-severing mechanism, and a bundle-holding device.

28. Starting and stopping mechanism comprising a valve, a rod $m^7$ forming part of the operating mechanism for the valve, a connection between the valve and the rod $m^7$, a lever $m^8$ acting upon the lever $m^7$, a lever $m^2$ acting upon the lever $m^3$, and a cam $m^0$ for acting upon the levers.

29. In a machine of the character described, the combination of a bundle-compress, a cord-carrier, a bundle-holder as $h^7$, means for operating the said bundle-holder, a driving-bar and a cord-cutter.

30. In a machine of the character described, the combination of a bundle-compress, the said compress comprising a plurality of gripping members one of which is movable carrying a cord-carrier, associated in operative relation with a grip-bar and a driving-bar.

31. In a machine of the character described, the combination of a bundle-compress carrying a cord-carrier, a bundle-holder as $h^7$, means for operating the said bundle-holder, a grip-bar, a driving-bar, a cord-cutter and a cord-holder.

32. In a machine of the character described, the combination of presser-plates $c'$, slotted presser-plates $e'$, a cross-head E in which the slotted presser-plates are carried, springs interposed between the plates and cross-head, and a cord-carrying arm $b^9$ and fastener-driving mechanism.

33. The combination of a two-part bundle-compress, and means for operating the same, combined with a cord-carrier and a bundle-holder, independently-moving grip and driving bars, and a cord-cutter and means for operating the said cord-carrier, bars and cutter.

34. In a machine of the character described, the combination of a plurality-member compress, one of whose members is movable, means for moving the same, and a bundle-binding mechanism, the said bundle-binding mechanism being set into operation by the movement of the movable member of the compress.

35. In a machine of the character described, the combination of a bundle-compress, a cord-carrier and a driving-box comprising in its structure a cord-retaining means, and a driving-bar actuating the cord-retaining means to cause the said cord-retaining means to release the cord.

36. In a machine of the character described, the combination of a bundle-compress, a cord-carrier and a driving-box comprising in its structure a movable fastener-feeder, a driving-bar, the said fastener-feeder being actuated from the driving-bar, and a guiding device for guiding the fastener to the driving-point.

37. In a machine of the character described, the combination of a plurality-member compress, one of whose members is movable, a cord-carrier and a driving-box comprising in its structure a cord-retaining mechanism and fastener-driving mechanism combined with means for releasing the cord by the movement of one of the members of the compress.

38. In a machine of the character described, the combination of a plurality-member compress one of whose members is movable, a cord-carrier and a driving-box comprising in its structure a cord-retainer and fastener-driving mechanism combined with means for locking the cord-retainer and with means for unlocking the said cord-retainer by the movement of the movable member of the compress.

39. In a machine of the character described, a cord holding and releasing means comprising a pivoted lever as $b^{24}$, means for swinging the lever as the lug $b^{22}$, a locking device as the pin $b^{27}$ and releasing mechanism for the locking device consisting of a bar as $b^{29}$, and a movable actuating-lever therefor combined with cam mechanism to move the said actuating-lever, all combined with a bundle-binder.

40. In a machine of the character described, the combination of a fluid pressure-actuated compressing mechanism, a cord-carrier and a power-driven fastener-setting mechanism actuated independently of the compress and means for operating the said compressing and fastener-setting mechanisms in harmony with each other.

41. In a machine of the character described, the combination of a fluid-pressure-actuated compress, a cord-carrier, a power-driven fastener-driving mechanism actuated independently of the compress, and means for starting the fastener-driving mechanism from the movement of the compress.

42. In a machine of the character described, the combination of a bundle-compress, a cord-carrier, means for raising the cord-carrier by the movement of the compress and means for swinging the cord-carrier by the combined action of independent mechanism and the movement of the compress, substantially as described.

43. In a machine of the character described, the combination with a bundle-compress having a movable member in which the bundle is carried, a driving-box located in the line of movement of the bundle and comprising in its structure cord-retaining means, a fastener-feeder and a driving-bar.

44. In a machine of the character described, the combination with a compress which moves a bundle, of a driving-box comprising in its structure a cord-retainer, a movable grip-bar, a movable driving-bar and a fastener-feeder.

45. In a machine of the character described, a driving-box comprising in its structure a pivoted cord-holder, a grip-bar, a separator-bar, a driving-bar and means for operating the said grip-bar, separator-bar and driving-bar.

46. In a machine of the character described, a driving-box comprising in its structure a spring-pressed cord-retainer, a grip-bar carrying a separator-bar, and a driving-bar.

47. In a machine of the character described, a driving-box comprising in its structure a cord-retaining device consisting of independently-operating cord-retainers, a grip-bar, a driving-bar, a separator-bar carried by one of the bars and acting upon one of the cord-retainers, and actuating means carried by the other bar acting upon the other cord-retainer.

48. In a machine of the character described, a driving-box comprising in its structure a cord-retaining device comprising a plurality of cord-retainers, independently-moving driving and grip bars, means for controlling the cord-retainers from the bars, and a locking device for one of the cord-retainers.

49. In a machine of the character described, a driving-box comprising in its structure a cord-retaining device, a grip-bar, a driving-bar moving independently of the grip-bar, and a fastener-feeder operated from the driving-bar.

50. In a machine of the character described, a driving-box comprising in its structure a cord-retaining device, a fastener-feeder and a driving-bar coöperating with the fastener-feeder and with the cord-retaining device to open the said cord-retaining device to release the cord.

51. In a machine of the character described, a driving-box comprising in its structure a cord-retaining device, a fastener-feeder, a driving-bar coöperating with the fastener-feeder and with the cord-retaining device to open the said cord-retaining device to release the cord, and a cutter.

52. In a machine of the character described, a driving-box comprising in its structure a cord-retaining mechanism, a driving-bar, a grip-bar, and a fastener-feeder interposed between the bars.

53. In a machine of the character described, a driving-box comprising in its structure a cord-retainer, a grip-bar and a driving-bar, one of which bars is slotted, a fastener-carrier entering the slot, a guiding device for the fastener, and a device for removing a fastener from the fastener-carrier.

54. In a machine of the character described, the combination of a bundle-compress having a movable member, a cord-carrier, a plurality of cord-retainers and means for successively operating the retainers in harmony with the movement of the movable member of the compress combined with devices for securing the ends of the cord to each other when the bundle has been completed.

55. A combination bundling structure comprising the following elements in operative relation, to wit: a bundle-compress having a movable member, a cord-carrier, operating mechanism therefor, to cause the same to surround a bundle, fastener holding and driving means and means for severing the cord after the fastener holding and driving means has operated the said cord-carrier-operating mechanism, fastener holding and driving means and cord-severing means being set into operation by the movement of the movable member of the compress.

56. A bundle-compressing mechanism combined with a bundle-binding mechanism, the said compressing and binding mechanisms being operated by independent means and being distinct and separate from each other and means for starting the bundle-binding mechanism from the bundle-compressing mechanism.

ALBERT BALL.

Witnesses:
F. A. BALL,
H. H. MERCER.